(12) United States Patent
Schindler

(10) Patent No.: US 11,311,888 B2
(45) Date of Patent: Apr. 26, 2022

(54) ELECTROSTATIC PRECIPITATOR

(71) Applicant: Clean Air Enterprise AG, Holzhaeusern (CH)

(72) Inventor: Kaspar Schindler, Unterkulm (CH)

(73) Assignee: Clean Air Enterprise AG, Holzhaeusern (CH)

( * ) Notice: Subject to any disclaimer, the term of this patent is extended or adjusted under 35 U.S.C. 154(b) by 391 days.

(21) Appl. No.: 16/476,065

(22) PCT Filed: Jan. 3, 2018

(86) PCT No.: PCT/EP2018/050093
§ 371 (c)(1),
(2) Date: Jul. 3, 2019

(87) PCT Pub. No.: WO2018/137899
PCT Pub. Date: Aug. 2, 2018

(65) Prior Publication Data
US 2020/0009578 A1    Jan. 9, 2020

(30) Foreign Application Priority Data

Jan. 30, 2017 (CH) .......................................... 98/17

(51) Int. Cl.
*B03C 3/12* (2006.01)
*B03C 3/68* (2006.01)
(Continued)

(52) U.S. Cl.
CPC ................ *B03C 3/12* (2013.01); *B03C 3/68* (2013.01); *B01D 2259/812* (2013.01);
(Continued)

(58) Field of Classification Search
CPC combination set(s) only.
See application file for complete search history.

(56) References Cited

U.S. PATENT DOCUMENTS 2,897,914 A * 8/1959 Camp .................. B03C 3/68
96/22
2,978,065 A * 4/1961 Berg .................. B03C 3/66
96/20
(Continued)

FOREIGN PATENT DOCUMENTS

CH       702993 A1    10/2011
CN      1032122 A      4/1989
(Continued)

OTHER PUBLICATIONS

Swiss Patent Search Report from Related Case.
(Continued)

*Primary Examiner* — Christopher P Jones
*Assistant Examiner* — Sonji Turner
(74) *Attorney, Agent, or Firm* — CanaanLaw, P.C.; David B. Ritchie

(57) ABSTRACT

The invention concerns an electrostatic precipitator comprising an ionisation stage, a collector stage and a power supply. The power supply comprises a first high-voltage power supply unit for applying a first DC high voltage to the ionization stage and a second high-voltage power supply unit for applying a second DC high voltage to the collector stage. The first high-voltage power supply unit is configured to operate the ionization stage current-controlled. A current sensor required for this is advantageously arranged in the return line carrying low voltage, for which purpose the first high-voltage power supply unit and the second high-voltage power supply unit are galvanically isolated from the mains connection and from each other.

13 Claims, 2 Drawing Sheets

(51) Int. Cl.
    *B03C 3/41*    (2006.01)
    *F24F 11/00*   (2018.01)
    *F24F 8/30*    (2021.01)

(52) U.S. Cl.
    CPC .................................. *B03C 3/41* (2013.01);
        *F24F 8/30* (2021.01); *F24F 11/0001* (2013.01)

(56) References Cited

U.S. PATENT DOCUMENTS

| | | | | |
|---|---|---|---|---|
| 3,507,096 | A * | 4/1970 | Hall | B03C 3/68 96/21 |
| 3,877,896 | A * | 4/1975 | Muskovac | B03C 3/68 96/22 |
| 4,156,885 | A | 5/1979 | Baker et al. | |
| 4,290,003 | A * | 9/1981 | Lanese | B03C 3/68 323/241 |
| 4,390,830 | A * | 6/1983 | Laugesen | B03C 3/68 323/237 |
| 4,486,704 | A * | 12/1984 | Gustafsson | B03C 3/68 96/23 |
| 4,490,159 | A * | 12/1984 | Matts | B03C 3/68 95/3 |
| 4,522,635 | A * | 6/1985 | Matts | B03C 3/68 323/903 |
| 4,626,260 | A * | 12/1986 | Jorgensen | B03C 3/68 95/6 |
| 4,680,036 | A * | 7/1987 | Leussler | B03C 3/68 95/6 |
| 4,704,672 | A * | 11/1987 | Gustafsson | B03C 3/68 95/26 |
| 4,808,200 | A * | 2/1989 | Dallhammer | B23H 1/022 95/6 |
| 5,068,811 | A * | 11/1991 | Johnston | B03C 3/68 700/297 |
| 5,378,978 | A * | 1/1995 | Gallo | B03C 3/68 323/241 |
| 5,575,836 | A * | 11/1996 | Sugiura | B03C 3/68 96/82 |
| 5,629,844 | A * | 5/1997 | Krichtafovitch | B03C 3/68 363/15 |
| 5,737,197 | A * | 4/1998 | Krichtafovitch | B03C 3/68 363/17 |
| 5,751,150 | A * | 5/1998 | Rippel | G01R 31/386 324/537 |
| 6,282,106 | B2 * | 8/2001 | Grass | B03C 3/66 323/903 |
| 6,508,861 | B1 | 1/2003 | Ray | |
| 7,833,322 | B2 * | 11/2010 | Botvinnik | B03C 3/68 96/21 |
| 2004/0212329 | A1 | 10/2004 | Krichtafovitch et al. | |
| 2007/0046219 | A1 | 3/2007 | Krichtafovitch et al. | |
| 2007/0210734 | A1 | 9/2007 | Botvinnik et al. | |
| 2010/0313761 | A1 | 12/2010 | Tanaka et al. | |
| 2013/0047857 | A1 | 2/2013 | Bohlen | |
| 2014/0345463 | A1 | 1/2014 | Apte et al. | |
| 2017/0008008 | A1 * | 1/2017 | Umase | B03C 3/47 |
| 2017/0354981 | A1 * | 12/2017 | Krichtafovitch | B03C 3/47 |

FOREIGN PATENT DOCUMENTS

| | | |
|---|---|---|
| CN | 1993796 A | 7/2007 |
| CN | 201618612 U | 11/2010 |
| CN | 102139244 A | 8/2013 |
| CN | 203840236 U | 9/2014 |
| CN | 104941802 A | 9/2015 |
| EP | 2025411 A1 | 2/2009 |
| JP | H02222737 A | 9/1990 |
| JP | H06143998 A | 5/1994 |
| JP | H07108192 A | 4/1995 |
| JP | H11267547 A | 10/1999 |
| JP | 2007225246 A | 9/2007 |
| JP | 2009-274036 A | 11/2009 |
| JP | 2011072870 A | 4/2011 |
| JP | 201504413 A | 3/2015 |
| RU | 2291000 C1 | 1/2001 |
| SU | 1526832 A1 | 12/1989 |

OTHER PUBLICATIONS

Chinese Patent Office Search Report dated Mar. 4, 2020 in related patent application.
Chinese Patent Office Search Report dated Dec. 3, 2020 for related case, App. No CN-2018-8000-89647, filed Jan. 3, 2018.
WIPO PCT IPRP Dated Jul. 30, 2019 Concerning related Case PCT/EP2018/050093.
Russian Patent Office Search Report dated Jan. 11, 2021 for related case, App. No. RU-2019-122164/03(043314), filed Jan. 3, 2018.
Japanese Patent Office Search Report dated Oct. 21, 2021 for related case, App. No JP-2019-528025—the references previously cited herein are not provided—only the previously uncited references.

* cited by examiner

ELECTROSTATIC PRECIPITATOR

PRIORITY CLAIM

Applicant hereby claims foreign priority under 35 U.S.C. § 119 from International Patent Application No. PCT/EP2018/050093, filed Jan. 3, 2018, which in turn claims priority to Swiss Application No. 98/17, filed Jan. 30, 2017, the disclosures of which are both herein incorporated by reference.

The invention concerns an electrostatic precipitator designed for use in a building ventilation system.

BACKGROUND OF THE INVENTION

Electrostatic precipitators are used, for example, to filter out particles contained in a gas or air stream. Although electrostatic precipitators can be used in ventilation equipment, air conditioners and air conditioning systems, they have not become established in the ventilation industry. In the ventilation industry, especially in building ventilation systems, pocket filters are still used.

Electrostatic precipitators work with corona discharge and electrostatic fields. They contain an ionization stage and a collector stage, as well as a high-voltage power supply device to operate them. Dust particles, aerosols, etc. flowing with the air into the electrostatic precipitator are electrostatically charged in the ionisation stage and then deposited at electrode surfaces of the collector stage. The high-voltage power supply device must supply both a DC high voltage for generating the corona discharge in the ionization stage and a smaller DC high voltage for generating a strong electrostatic field in the collector stage. These DC high voltages are typically generated by a cascade of voltage doublers, whereby the voltage at the output of the last voltage doubler is fed to the ionization stage and the voltage at the output of one of the preceding voltage doublers is fed to the collector stage. The DC high voltage for the collector stage is therefore half as high as or even lower than the DC high voltage for the ionization stage.

For use in an existing building ventilation system, an electrostatic precipitator must meet various requirements. These include, for example, specified dimensions so that the electrostatic precipitator can replace a pocket filter, specified air volume flows and a specified filter separation efficiency.

It is the object of the invention to develop an electrostatic precipitator for building ventilation systems, which should achieve the filter separation efficiency E10 with an air volume flow of 3400 m³/h related to the standard size (W/H/D) 592 mm×592 mm×300 mm.

SHORT DESCRIPTION OF THE INVENTION

The invention concerns the power supply and the control electronics of such an electrostatic precipitator, the design of which is based on the following findings:

(1) The current flowing through the ionization stage is an important indicator of the reliability of the ionization of the particles to be filtered out. If no current or a too low current flows through the ionization stage despite the DC high voltage applied, then no ionization or insufficient ionization takes place. As a result, the electrostatic precipitator no longer purifies the air or only purifies it insufficiently.

(2) When operating the electrostatic precipitator with the maximum air volume flow of 3400 m³/h, the DC high voltage applied to the collector stage must be increased to values in the range of 5.5 to 6 kV so that the required filtration efficiency E10 can be achieved.

(3) Normally, practically no current flows through the collector stage, i.e. the current is in the range of at most a few microamperes. However, if the DC high voltage exceeds a threshold value that is slightly above 5 kV for the electrostatic precipitator in question, the current rises and reaches values in the milliampere range relatively quickly.

(4) A high voltage power supply device of the type described above, in which there is a cascade of voltage doublers on which both the DC high voltage for the ionization stage and the DC high voltage for the collector stage are tapped, loses control of the DC high voltage applied to the ionization stage if the current flowing through the collector stage is in the milliampere range. This means that the DC high voltage for the ionisation stage is then no longer stable.

A specific task of the invention is therefore to develop a power supply and control electronics for the operation of the electrostatic precipitator that take these findings into account. In addition, the electrostatic precipitator should generate as little ozone as possible and consume as little energy as possible.

In accordance with the invention, the power supply, which supplies the control electronics, the ionization stage and the collector stage with power at voltages other than those provided by the mains supply, comprises a first high-voltage power supply unit for supplying the ionization stage with a first DC high voltage and a second high-voltage power supply unit for supplying the collector stage with a second DC high voltage. This enables the collector stage to be operated with a DC high voltage at which a current can flow in the milliamperemeter range without the DC high voltage of the ionization stage becoming unstable. The first high voltage power supply unit further comprises a current sensor and a voltage controller, wherein the current sensor measures the ionisation current flowing through the ionisation stage and the voltage controller ensures that the first DC high voltage is adjusted so that the measured ionisation current reaches a predetermined value. The ionization stage is thus operated current-controlled, i.e. the ionization stage is supplied with a pre-settable DC current.

In addition, the electrostatic precipitator is preferably grounded, i.e. it has a terminal which can be connected to earth, and the ionisation stage and collector stage contain electrodes which are connected to the terminal which can be connected to earth.

The control electronics is advantageously also configured
a) to adjust the DC current flowing through the ionization stage and the second DC high voltage applied to the collector stage in accordance with the air volume flow flowing through the electrostatic precipitator, i.e. to reduce the DC current and the second DC high voltage when the air volume flow becomes smaller and to increase them when the air volume flow becomes larger, respectively; and
b) to monitor the DC current flowing through the collector stage and to output an alarm signal or fault signal if the DC current is outside a specified interval.

The realization of these two points is done as follows:
a) The control electronics comprises a control input for receiving at least one control signal and is configured to adjust the DC current to be preset for the ionisation stage and the second DC high voltage to be applied to the collector stage in accordance with the value of the at least one control signal.
b) The second high-voltage power supply unit comprises a current sensor which measures the DC current flowing through the collector stage, and the control electronics is set up to output an alarm signal or fault signal when the DC current falls below a predetermined minimum value and/or exceeds a predetermined maximum value.

In order that the two DC currents can be measured by means of a so-called shunt on the low-voltage side of the high-voltage power supply units, the two high-voltage power supply units are galvanically separated on the input side both from the mains connection (and thus from earth) and also from each other. This is done by galvanic isolating elements.

The invention is explained in more detail below by means of exemplary embodiments and the drawing.

DETAILED DESCRIPTION OF THE INVENTION

Figure 1:
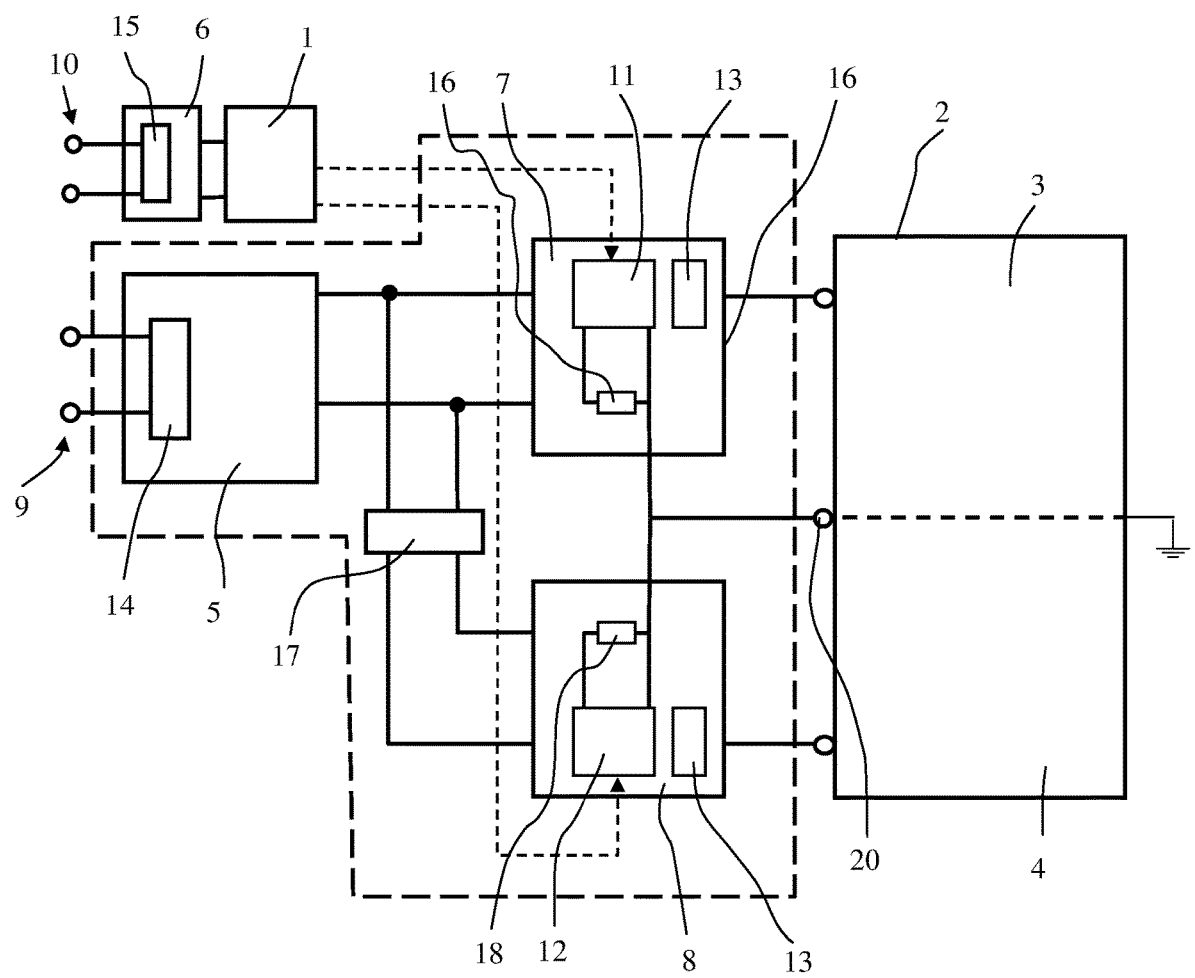
FIG. 1 shows a block diagram of the power supply and control electronics of an electrostatic precipitator according to a first embodiment.

FIG. 1 shows a block diagram of a power supply according to the invention for the power supply of the high voltage stages and the control electronics 1 of an electrostatic precipitator 2 according to a first embodiment. The electrostatic precipitator 2 comprises an ionisation stage 3 and, in this example, a single collector stage 4. The power supply preferably comprises a power supply unit for the energy supply of the ionisation stage 3 and the collector stage 4 and a separate control power supply unit for the energy supply of the control electronics 1. The power supply therefore comprises a total of two low-voltage power supply units 5 and 6 and two high-voltage power supply units 7 and 8.

The power supply comprises the first low-voltage power supply unit 5, which converts the AC mains voltage at the mains connection 9 into a low-voltage DC voltage, for example into a DC voltage of 24 V, as well as two high-voltage power supply units 7, 8 connected to it. The first high voltage power supply unit 7 serves to supply the ionisation stage 3 with a first DC high voltage and the second high voltage power supply unit 8 serves to supply the collector stage 4 with a second DC high voltage.

The use of two high-voltage power supply units 7, 8 makes it possible to operate the ionisation stage 3 and the collector stage 4 independently of each other and thus to optimise the operation of both stages individually. In particular, this makes it possible to operate the collector stage 4 (also) at such a high DC high voltage that a collector current flows in the milliampere range without affecting the DC high voltage applied to the ionization stage 3.

The control power supply unit comprises the second low-voltage power supply unit 6, which also converts the mains voltage at the mains connection 10 into a low-voltage DC voltage, e.g., into a DC voltage of 12 V.

The separate supply of the control electronics 1 and the power electronics of the electrostatic precipitator 2 makes it possible that display elements of the control electronics 1, which provide information about the status of the electrostatic precipitator 2, such as LEDs, also light up when the power electronics is disconnected from the mains. Testing and maintenance work on the control electronics 1 as well as on the electrostatic precipitator 2 can be carried out at any time without endangering the operator when the power supply to the control electronics 1 is switched on.

The ionization stage 3 and the collector stage 4 of the electrostatic precipitator 2 contain electrodes, usually plate-shaped electrodes, which are preferably earthed. The two low-voltage power supply units 5 and 6 each contain a galvanic isolating element 14 and 15, respectively, which galvanically separates the output side from the input side. They are, for example, transformer power supplies whose transformer is a galvanic isolating element. The two high-voltage power supply units 7 and 8 are thus electrically isolated from the mains connection 9 and 10, respectively. The high voltage supply units 7, 8 contain a voltage controller 11 or 12, respectively, and a downstream voltage amplifier 13 for generating the first or second DC high voltage, respectively. The voltage amplifier 13 consists, for example, of a cascade of voltage doublers.

The operation of the ionisation stage 3 occurs preferably current-controlled, i.e. the first DC high voltage generated by the first high-voltage power supply unit 7 is adjusted such that the ionisation current flowing through the ionisation stage 3 (a DC current) assumes a predetermined value. The first high-voltage power supply unit 7 comprises a current sensor which measures the ionisation current flowing through the ionisation stage 3 and whose output signal is fed to the voltage controller 11. The voltage controller 11 regulates the DC voltage delivered to the subsequent voltage amplifier 13 in such a way that the first DC high voltage takes on a value such that the measured ionisation current assumes the specified value. The ionization current can be measured either in the supply line in which it flows from the first high voltage power supply unit 7 to the ionization electrode of the ionization stage 3, or in the return line in which the ionization current flows back from earth (since the corresponding electrodes of the electrostatic precipitator 2 are earthed) to the high voltage power supply unit 7. Since the ionization electrode is subjected to a very high DC high voltage of several kilovolts, measuring the ionization current in the return line is much easier. As can be seen from FIG. 1, the return lines from the earthed terminal 20 of the electrostatic precipitator 2 to the two high-voltage power supply units 7 and 8 first run together and then branch off. The ionisation current flowing back to the first high-voltage power supply unit 7 can be measured using a shunt 16 (ohmic resistance) mounted in the first high-voltage power supply unit 7 in the return line after the branch. The voltage drop at the shunt 16 is measured and fed as a current value to the voltage controller 11, which compares the measured current value with a given setpoint value and therefrom forms the control voltage for the subsequent voltage amplifier. For this, however, it is necessary that the circuit for the ionisation current is "floating", i.e. there must be no other current path on which current can flow from earth to the ionisation electrode of the ionisation stage 3. This is achieved by the fact that the first high-voltage power supply unit 7 is galvanically separated from both the mains connections 9 and 10 (because the outputs of the two low-voltage power supplies 5 and 6 are galvanically separated from the mains connection 9 and 10 respectively) and from the second high-voltage power supply unit 8. The galvanic isolation of the two high-voltage power supply units 7 and 8 is provided by a galvanic isolating element 17.

The control of the electrostatic precipitator 2 is preferably power-dependent. The electrostatic precipitator 2 is specified for a certain filtration efficiency, for example the filtration efficiency E10, and for a maximum air volume flow at which the specified filtration efficiency is still reached. The lower the air volume flow is, the lower is the air flow velocity and the longer is the residence time of the ionized particles in the electrostatic precipitator 2. The second DC high voltage applied to the collector stage 4 generates an electric field strength in the collector stage 4 which acts as an electric force on the ionized particles and accelerates them, thus causing the ionized particles to be deposited at the electrodes. The longer the residence time of the ionized particles in the collector stage 4 is, the lower can be the electric field strength and thus also the second DC high voltage.

The control electronics is therefore preferably configured to set the second DC high voltage to be applied to the collector stage 4 according to the actual air volume flow. Usually, the ionisation current can also be reduced if the air volume flow decreases. The control electronics is therefore preferably also configured to set the ionisation current according to the actual air volume flow. For this purpose, the control electronics includes a control input for receiving one or more control signals and means (hardware and/or software) to adjust the ionizing current and the second DC high voltage according to the control signal(s).

The second high-voltage power supply unit 8 advantageously also comprises a second current sensor, also in the form of a shunt 18, which measures the collector current flowing through the collector stage 4 (a DC current), and the control electronics 1 is configured to display or output an alarm signal or fault signal if the measured collector current exceeds a predetermined maximum current.

Figure 2:
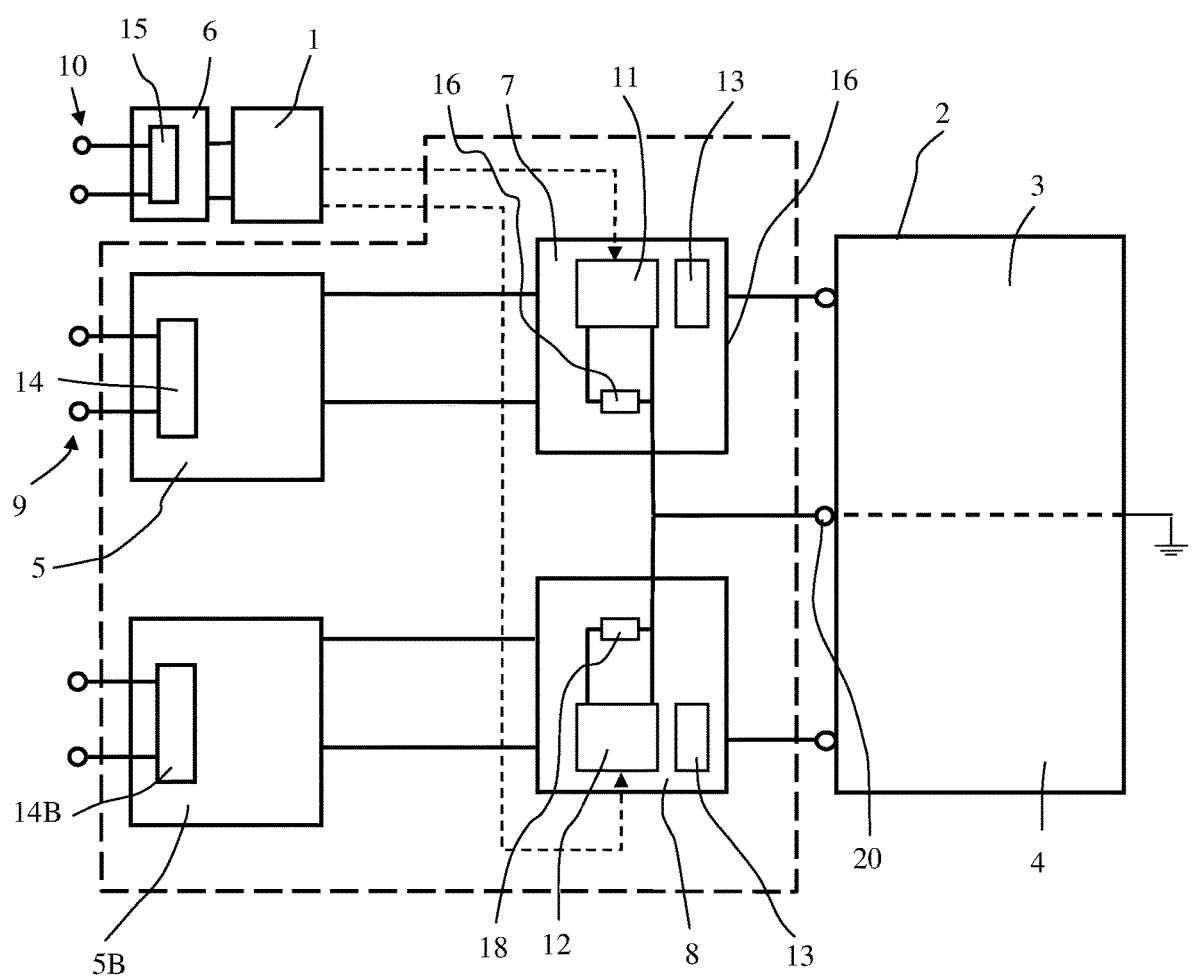
FIG. 2 shows a block diagram of the power supply and control electronics of an electrostatic precipitator according to a second embodiment.

FIG. 2 shows a block diagram of a power supply according to the invention for the power supply of the high-voltage power supply units 7 and 8 and the control electronics 1 of an electrostatic precipitator 2 according to a second embodiment. Here, the power supply comprises two low-voltage power supplies 5 and 5B, each containing a galvanic isolating element 14 or galvanic isolating element 14B, respectively. Also in this version, the high-voltage power supply units 7 and 8 are galvanically isolated from the mains and from each other.

While embodiments of this invention have been shown and described, it would be apparent to those skilled in the art that more modifications than mentioned above are possible without departing from the inventive concepts herein. The invention, therefore, is not to be restricted except by the appended claims and their equivalents.

What is claimed is:

1. An electrostatic precipitator, comprising:
an ionization stage,
a collector stage, and
a power supply, the power supply comprising a first high-voltage power supply unit configured to apply a first DC high voltage to the ionization stage and a second high-voltage power supply unit configured to apply a second DC high voltage to the collector stage, wherein
the first high-voltage power supply unit comprises a current sensor and a voltage controller,
the current sensor is configured to measure an ionization current flowing through the ionization stage,
the voltage controller is configured to ensure that the first DC high voltage is adjusted in such a way that the ionization current reaches a predetermined value,
the electrostatic precipitator has a terminal which can be connected to earth ground,
the ionization stage and the collector stage contain electrodes which are connected to the terminal,
the first high-voltage power supply unit and the second high-voltage power supply unit are galvanically separated both from a mains connection and from one another, and
the current sensor is arranged in a return line which leads from the terminal to the first high-voltage power supply unit.

2. The electrostatic precipitator according to claim 1, further comprising a control input to which a control signal can be applied, wherein the first high-voltage power supply unit is configured to adjust the ionization current according to a value corresponding to the control signal.

3. The electrostatic precipitator according to claim 1, wherein the second high voltage power supply is configured to adjust the second DC high voltage according to a value corresponding to the control signal.

4. The electrostatic precipitator according to claim 2, wherein the second high voltage power supply is configured to adjust the second DC high voltage according to the value corresponding to the control signal.

5. The electrostatic precipitator according to claim 1, wherein the second high-voltage power supply unit comprises a second current sensor, the second current sensor configured to measure a collector current flowing through the collector stage in a return line leading from the terminal to the second high-voltage power supply unit, and wherein an alarm signal or fault signal is generated when the collector current exceeds a predetermined maximum current.

6. An electrostatic precipitator, comprising:
an ionization stage,
a collector stage, and
a power supply, the power supply comprising a first high-voltage power supply unit configured to apply a first DC high voltage to the ionization stage and a second high-voltage power supply unit configured to apply a second DC high voltage to the collector stage, wherein
the first high-voltage power supply unit comprises a first current sensor and a first voltage controller,
the first current sensor is configured to measure an ionization current flowing through the ionization stage,
the first voltage controller is configured to ensure that the first DC high voltage is adjusted so that the ionization current reaches a predetermined value,
the electrostatic precipitator has a terminal which can be connected to earth ground,
the ionization stage and the collector stage contain electrodes which are connected to the terminal,
the first high-voltage power supply unit and the second high-voltage power supply unit are galvanically separated both from a mains connection and from one another, and
the first current sensor is arranged in a return line which leads from the terminal to the first high-voltage power supply unit, and
wherein the second high-voltage power supply unit comprises a second current sensor, the second current sensor configured to measure a collector current flowing through the collector stage in a return line leading from the terminal to the second high-voltage power supply unit.

7. The electrostatic precipitator according to claim 6, further comprising a control input to which a control signal can be applied, wherein the first high-voltage power supply unit is configured to adjust the ionization current according to a value corresponding to the control signal.

8. The electrostatic precipitator according to claim 6, wherein the second high voltage power supply is configured to adjust the second DC high voltage according to a value corresponding to the control signal.

9. The electrostatic precipitator according to claim 7, wherein the second high voltage power supply is configured to adjust the second DC high voltage according to the value corresponding to the control signal.

10. The electrostatic precipitator according to claim 6 wherein an alarm signal or fault signal is generated when the collector current exceeds a predetermined maximum current.

11. The electrostatic precipitator according to claim 7 wherein an alarm signal or fault signal is generated when the collector current exceeds a predetermined maximum current.

12. The electrostatic precipitator according to claim 8 wherein an alarm signal or fault signal is generated when the collector current exceeds a predetermined maximum current.

13. The electrostatic precipitator according to claim 9 wherein an alarm signal or fault signal is generated when the collector current exceeds a predetermined maximum current.

* * * * *